United States Patent
Maruyama et al.

(10) Patent No.: US 10,336,376 B2
(45) Date of Patent: Jul. 2, 2019

(54) FRONT VEHICLE-BODY STRUCTURE OF VEHICLE

(71) Applicant: MAZDA MOTOR CORPORATION, Hiroshima (JP)

(72) Inventors: Kenji Maruyama, Hiroshima (JP); Hidenori Matsuoka, Hiroshima (JP); Shigeaki Watanabe, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 323 days.

(21) Appl. No.: 15/345,386

(22) Filed: Nov. 7, 2016

(65) Prior Publication Data

US 2017/0174264 A1    Jun. 22, 2017

(30) Foreign Application Priority Data

Dec. 21, 2015  (JP) ................................. 2015-248510

(51) Int. Cl.
 *B62D 25/08*  (2006.01)
 *B62D 21/11*  (2006.01)
 *B62D 25/16*  (2006.01)

(52) U.S. Cl.
 CPC ............ *B62D 25/088* (2013.01); *B62D 21/11* (2013.01); *B62D 25/16* (2013.01); *B60Y 2306/09* (2013.01)

(58) Field of Classification Search
 CPC ............................... B62D 25/088; B62D 21/11
 See application file for complete search history.

(56) References Cited

U.S. PATENT DOCUMENTS

| | | | | |
|---|---|---|---|---|
| 6,951,366 | B2 * | 10/2005 | Tomita | B62D 21/09 296/187.08 |
| 7,192,071 | B2 * | 3/2007 | Watanabe | B62D 25/025 296/187.02 |
| 7,828,330 | B2 * | 11/2010 | Tamura | B62D 25/088 280/124.109 |
| 8,020,906 | B2 * | 9/2011 | Schmid | B60R 19/34 293/132 |
| 8,702,160 | B2 * | 4/2014 | Kurogi | B62D 25/025 296/205 |
| 2004/0056515 | A1 * | 3/2004 | Nomura | B62D 25/082 296/193.09 |

(Continued)

FOREIGN PATENT DOCUMENTS

| | | |
|---|---|---|
| JP | H11-034911 A | 2/1999 |
| JP | 2004-106704 A | 4/2004 |

(Continued)

*Primary Examiner* — Hilary L Gutman
(74) *Attorney, Agent, or Firm* — Studebaker & Brackett PC

(57) ABSTRACT

A front vehicle body comprises a front frame having a closed cross-section, an apron reinforcement, a suspension housing, and first and second bulkheads arranged in the closed cross-section of the front frame. The suspension housing comprises first and second open cross-sections extending in a vehicle width direction and interconnecting the front frame and the apron reinforcement. The first and second open cross-sections include front ridgeline portions which are a high-rigidity portion extending in the vehicle width direction. The first and second bulkheads are arranged in the closed cross-section and located at or near positions which are continuous to lower ends of the front ridgeline portions.

12 Claims, 11 Drawing Sheets

(56) References Cited

U.S. PATENT DOCUMENTS

2006/0006699 A1* 1/2006 Matsuyama ......... B62D 25/082
                                                         296/203.02
2016/0244103 A1* 8/2016 Amemiya .............. B62D 21/00

FOREIGN PATENT DOCUMENTS

| JP | 2011-005882 A | 1/2011 |
| JP | 2015-085801 A | 5/2015 |

\* cited by examiner

FRONT VEHICLE-BODY STRUCTURE OF VEHICLE

BACKGROUND OF THE INVENTION

The present invention relates to a front vehicle-body structure of a vehicle which comprises a suspension housing, to which a suspension component is attached and which is positioned at a vehicle's front portion.

A suspension housing to receive a load inputted from a damper of a front suspension is provided at a front portion of a vehicle, such as an automotive vehicle. In general, the suspension housing is arranged to connect a front frame extending in a vehicle longitudinal direction and an apron reinforcement extending in the vehicle longitudinal direction and arranged above and on an outward side, in a vehicle width direction, of the front frame (see Japanese Patent Laid-Open Publication No. 2011-005882, for example).

The suspension housing includes a housing body accommodating the front suspension, a suspension top portion supporting an upper end of the damper, connection portions for the front frame and the apron reinforcement, and others. The suspension housing is generally manufactured by a method of a press molding of a steel plate. Meanwhile, a method of casting the suspension housing with aluminum (die-cast aluminum) has been considered from viewpoints of relatively-poor forming flexibility of the press molding and perusing a further reduction of a vehicle-body weight.

A resistance against the load inputted from the suspension top portion is required for the suspension housing. Particularly, the suspension housing needs to be strong enough to restrain it from deforming, falling down inwardly in a vehicle width direction. Even if the inward falling-down deformation of 0.1 mm or so occurs, various performances of maneuverability/stability, NVH (Noise, Vibration, Harshness), strength/durability, and the like are affected by that.

SUMMARY OF THE INVENTION

An object of the present invention is to provide a front vehicle-body structure of a vehicle which can restrain the vehicle-width directional deformation of the suspension housing even when a large load is inputted to the suspension top portion.

The present invention is a front vehicle-body structure of a vehicle, comprising a front frame extending in a vehicle longitudinal direction and having a closed cross-section, an apron reinforcement extending in a vehicle longitudinal direction and arranged above and on an outward side, in a vehicle width direction, of the front frame, a suspension housing connecting the front frame and the apron reinforcement, to which a suspension component is attached, and a reinforcing member arranged in the closed cross-section of the front frame and joined to the front frame, wherein the suspension housing comprises an open cross-section extending in a vehicle width direction and interconnecting the front frame and the apron reinforcement, the open cross-section of the suspension housing includes a high-rigidity portion extending in the vehicle width direction, and the reinforcing member is located at or near a position which is continuous to an end portion, on the side of the front frame, of the high-rigidity portion.

According to the present front vehicle-body structure, since the suspension housing comprises the open cross-section extending in the vehicle width direction and the open cross-section includes the high-rigidity portion extending in the vehicle width direction, the resistance against the vehicle-width directional deformation of the suspension housing can be properly increased. Further, since the reinforcing member is located at or near the position which is continuous to the end portion, on the side of the front frame, of the high-rigidity portion, the face rigidity of a portion of the front frame where the load is transmitted from the suspension housing is increased by the reinforcing member, so that the load can be dispersed to other members. Accordingly, the vehicle-width directional deformation of the suspension housing can be restrained.

In the above-described front vehicle-body structure of the vehicle, it is preferable that the high-rigidity portion be a ridgeline portion where two faces of the open cross-section cross each other. According to this structure, the high-rigidity portion can be formed more easily than a case in which a bead or rib is provided at the closed cross-section.

In the above-described front vehicle-body structure of the vehicle, it is preferable that the front frame be composed of a pair of right-and-left front frames, a suspension cross member be provided between the pair of right-and-left front frames, and each of the pair of right-and-left front frames include an attachment portion for fixing the suspension cross member near an arrangement position of the reinforcing member. According to this structure, since the attachment portion for fixing the suspension cross member is arranged near an arrangement position of the reinforcing member, when the load is inputted to the reinforcing member from the suspension housing, the load can be properly dispersed to the front frame and the suspension cross member. Accordingly, the deformation of the suspension housing can be restrained properly.

In the above-described front vehicle-body structure of the vehicle, it is preferable that the reinforcing member be a bulkhead including a partition-face portion which partitions the closed cross-section, and the partition-face portion include a rigidity-reinforcement portion extending in a direction of an extension line of the end portion of the high-rigidity portion. According to this structure, the bulkhead having the high rigidity can be assembled inside the front frame in an application direction of the load inputted from the high-rigidity portion of the suspension housing. Accordingly, the strength of the closed cross-section of the front frame can be further increased.

In the above-described front vehicle-body structure of the vehicle, it is preferable that the reinforcing member be a bulkhead including a partition-face portion which partitions the closed cross-section, and the partition-face portion include a penetration hole which is provided with a flange portion at an edge portion thereof. According to this structure, since the partition-face portion includes the penetration hole even if the bulkhead is arranged in the closed cross-section of the front frame, a fluid, such as an electrodeposition coating solution, can be flowed in the closed cross-section through the penetration hole. Further, the weight reduction of the bulkhead can be achieved. Meanwhile, since the flange portion is provided at the edge portion of the penetration hole, the rigidity of the partition-face portion can be increased.

Other features, aspects, and advantages of the present invention will become apparent from the following description which refers to the accompanying drawings.

DETAILED DESCRIPTION OF THE INVENTION

[Outline of Front Vehicle-Body Structure of Vehicle]

Figure 1:
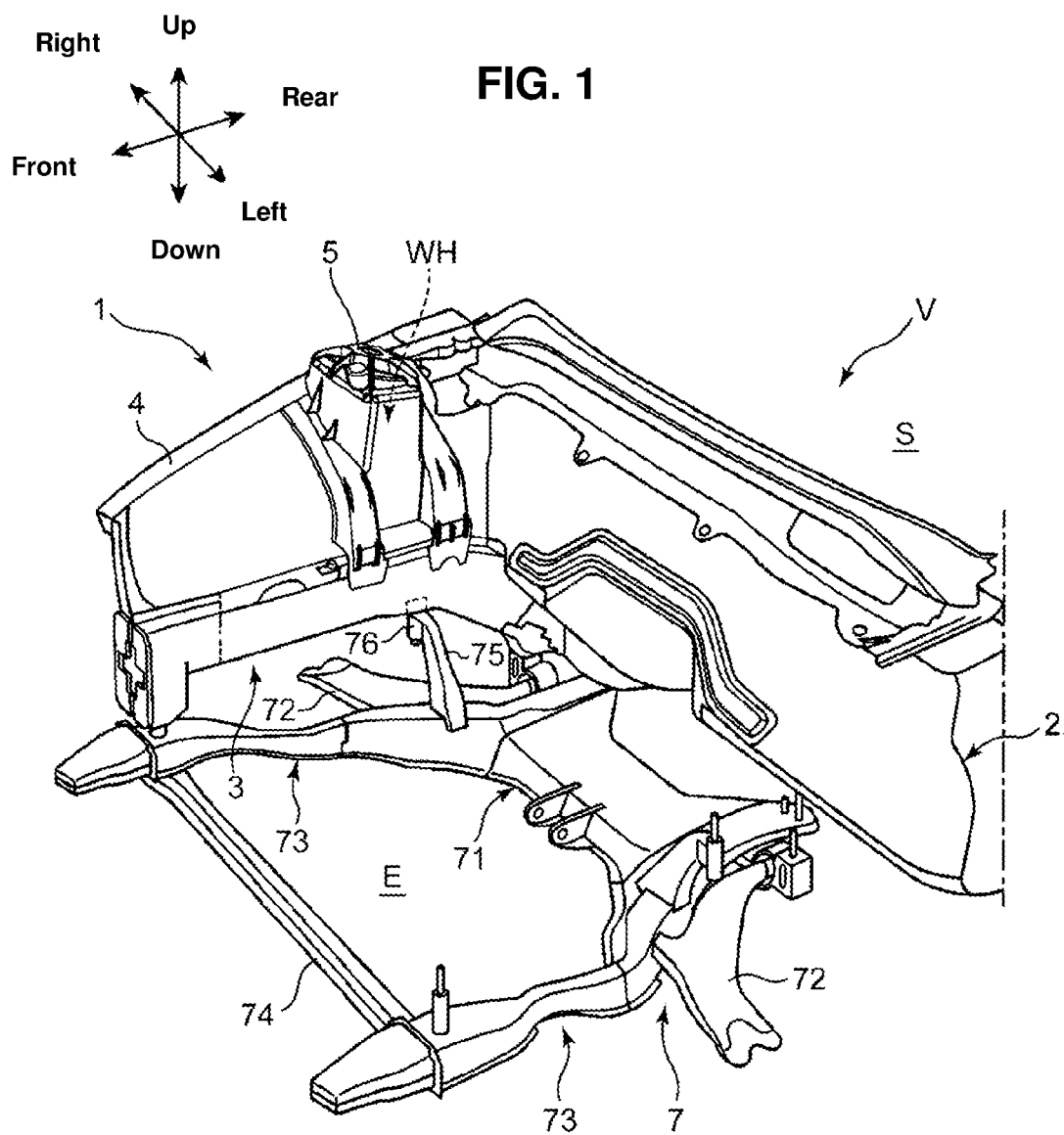
FIG. 1 is a perspective view schematically showing a front vehicle-body structure of a vehicle according to the present invention.

Hereafter, an embodiment of the present invention will be described referring to the accompanying drawings. FIG. 1 is a perspective view schematically showing a structure of a front vehicle body 1 of a vehicle V according to the present invention. Arrows of "Front" and "Rear" of a longitudinal direction, arrows of "Left" and "Right" of a vehicle width direction, and arrows of "Up" and "Down" of a vehicle height direction of the vehicle V are shown in FIG. 1. The arrows of "Front" "Rear" "Up" "Down" "Left" and "Right" shown in the following figures follow the directional indication shown in FIG. 1.

The front vehicle body 1 comprises a dash panel 2, a front frame 3, an apron reinforcement 4, a suspension housing 5, and a sab frame 7. The front frame 3, the apron reinforcement 4, and the suspension housing 5 are composed of a pair of right-and-left vehicle-body members, respectively, and each right-side part of those is only shown only in FIG. 1 in order to avoid complexity of the figure, omitting illustration of each left-side part of those.

The dash panel 2 is a laterally-long panel and longitudinally partitions a front part of a cabin S from an engine room E. The front frame 3 extends in the vehicle longitudinal direction and has a closed cross-section. A rear end of the front frame 3 is connected to a front side of the dash panel 2. Reinforcing members to reinforce the cross section (a first bulkhead 6A and a second bulkhead 6B, which will be described) are arranged in the closed cross-section of the front frame 3. The engine room E is provided between a pair of front frames 3, where an engine unit, not illustrated, which comprises an engine, a transmission and others is installed.

The apron reinforcement 4 is arranged above and on an outward side, in the vehicle width direction, of the front frame 3, and extends in the vehicle longitudinal direction. The right-side apron reinforcement 4 is arranged at an obliquely rightward-and-upward 45-degree position relative to the right-side front frame 3. There is a space for a wheel house WH which covers over a front wheel, not illustrated, between the apron reinforcement 4 and the front frame 3.

The suspension housing 5 is a member to which a suspension component, specifically an upper end of a damper (not illustrated) comprising a coil spring and a shock absorber, is attached. The suspension housing 5 is configured in a housing shape to open at its lower end and accommodate the damper, and interconnects the front frame 3 and the apron reinforcement 4 so as to cover over the wheel house WH. The suspension housing 5 is an aluminum die-cast product. This suspension housing 5 may be manufactured by pressing of a metal plate or the like, of course.

The sub frame 7 is a vehicle-body member arranged below the front frame 3. The sub frame 7 includes a suspension cross member 71 which is positioned below the engine room E and arranged between the pair of front frames 3. The sub frame 7 further includes a pair of suspension arms 72 which extends outward, in the vehicle width direction, from right-and-left both sides of the suspension cross member 71, a pair of right-and-left engine support members 73 which extend in the vehicle longitudinal direction, a front cross member 74 which extends between respective front ends of the pair of engine support members 73, and a pair of cross member arms 75. The cross member arm 75 is provided to rise on an upper face of the suspension cross member 71 and connect the front frame 3 and the suspension cross member 71. A cylindrical portion 76 which accommodates a fastening bolt (not illustrated) to fasten the both is provided at an upper end of the cross member arm 75.

[Major Part of Front Vehicle Body]

Figure 2:
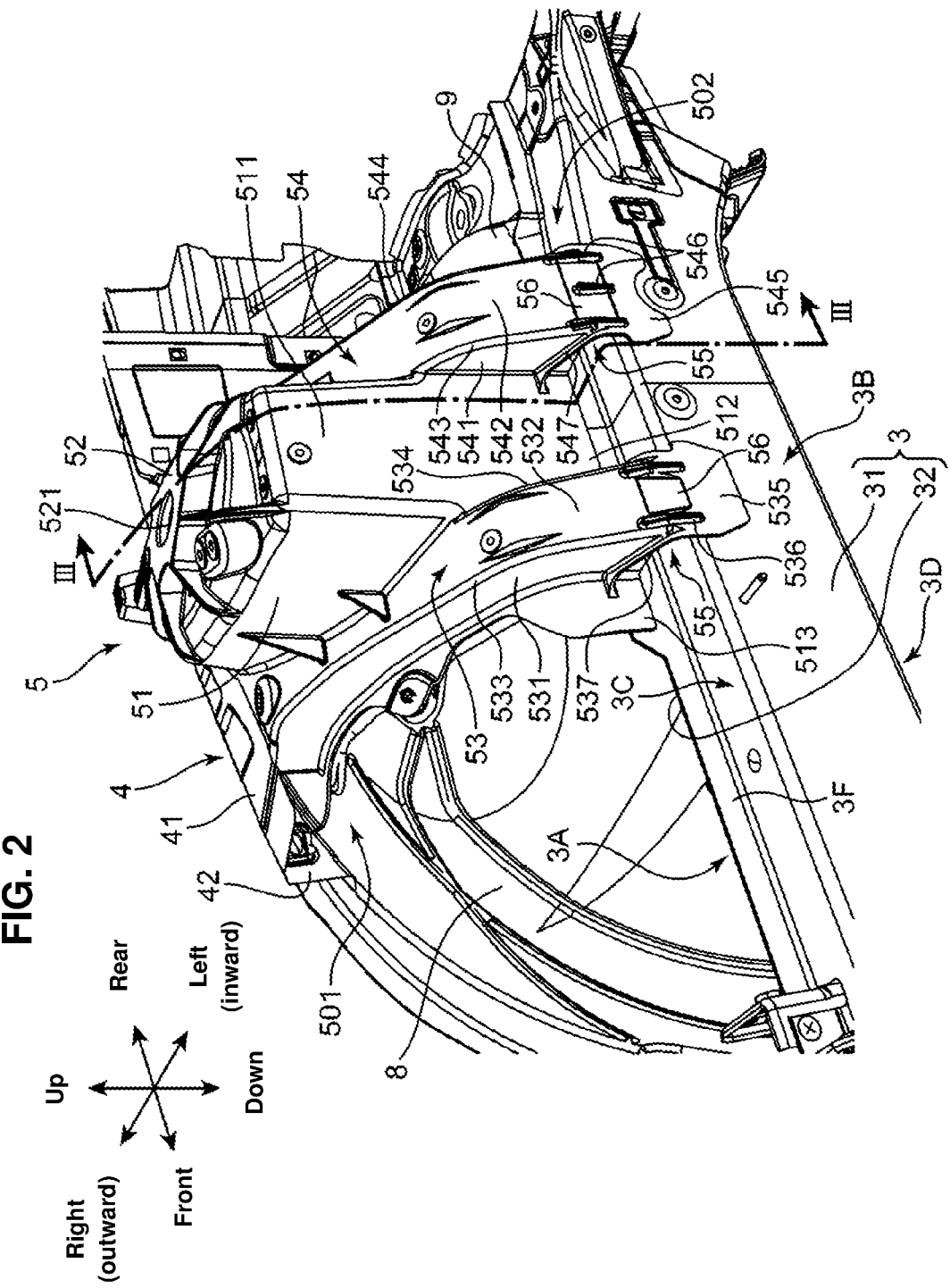
FIG. 2 is a perspective view of an assembled suspension housing of the front vehicle-body structure.
Figure 3:
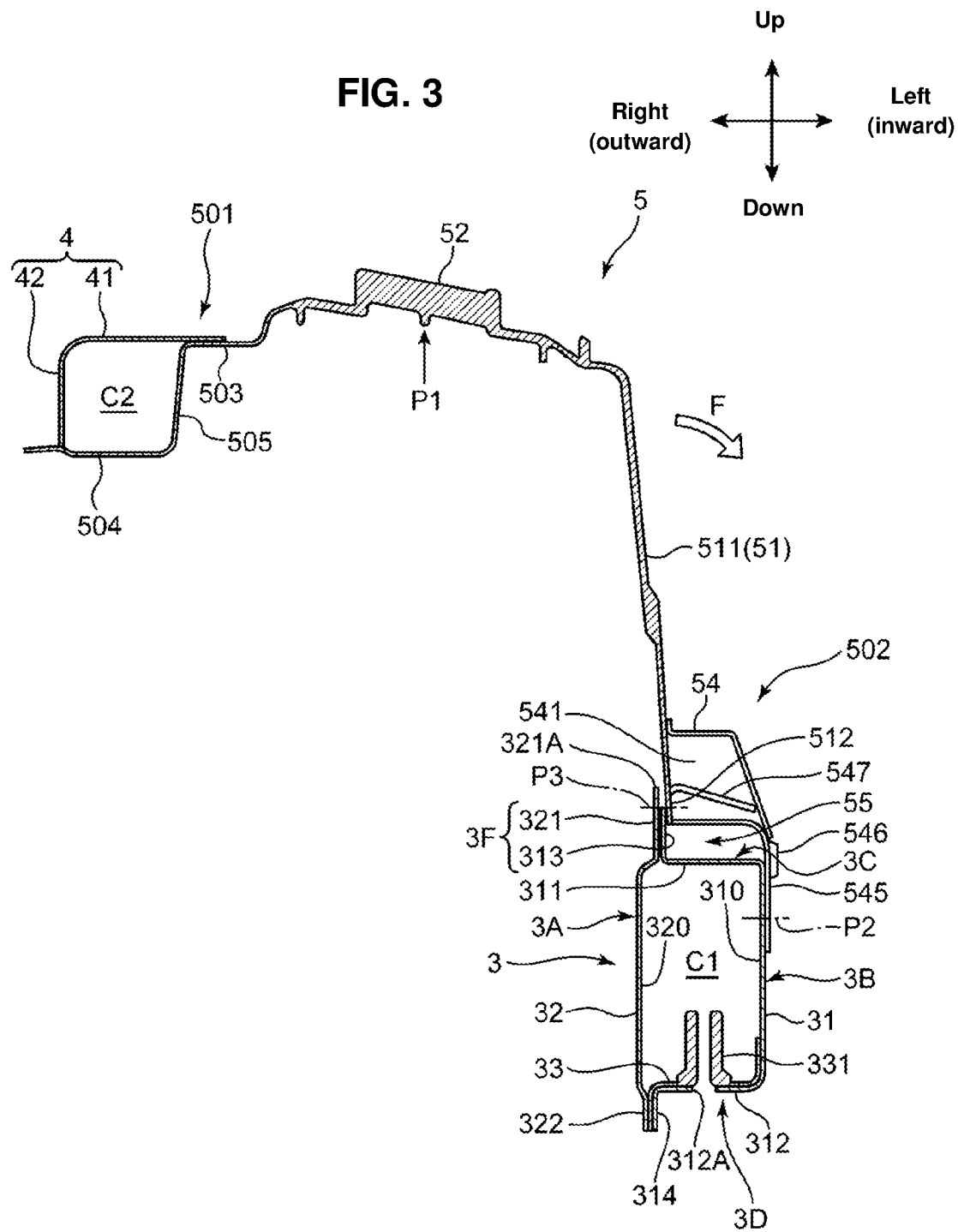
FIG. 3 is a schematic sectional view taken along line III-III of FIG. 2.
Figure 4:
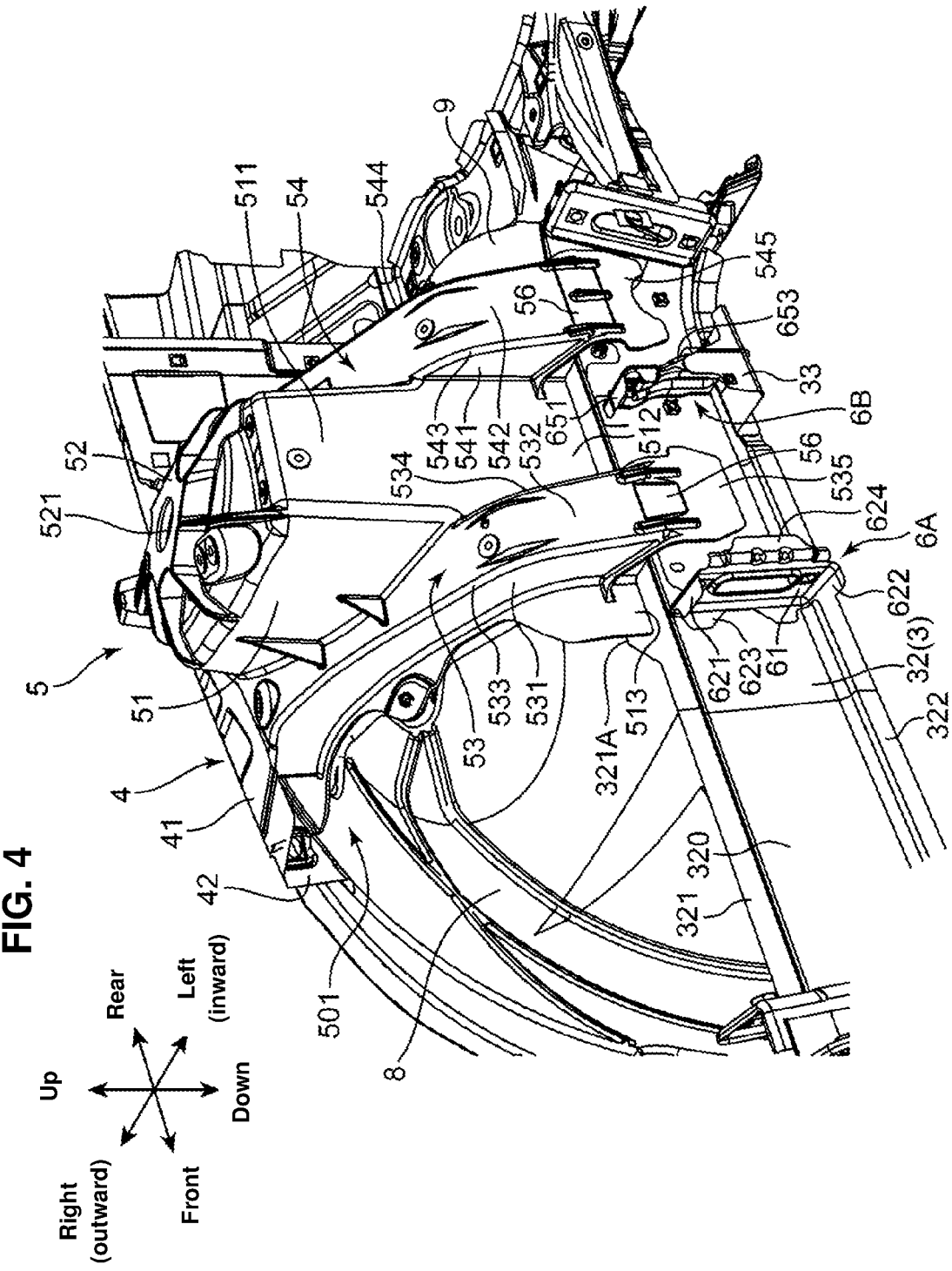
FIG. 4 is a perspective view of the front vehicle-body structure in a state in which a front frame inner is removed from a state shown in FIG. 2.

FIG. 2 is a perspective view of the assembled right-side suspension housing 5 of the front vehicle body 1. In this case, the left side corresponds to the inward side in the vehicle width direction ("inward" shown as the directional indication), and the right side corresponds to the outward side in the vehicle width direction ("outward" shown as the directional indication). FIG. 3 is a schematic sectional view taken along line III-III of FIG. 2, and FIG. 4 is a perspective view of the front vehicle-body structure in a state in which a front frame inner 31 is removed from a state shown in FIG. 2.

<Front Frame>

The front frame 3 is a vehicle-body rigidity member which forms a closed cross-section C1 extending in the vehicle longitudinal direction, and is a bent product which is made of a high-rigidity plate, such as a steel plate. The front frame 3 comprises the front frame inner 31 which has a roughly U-shaped cross section being relatively wide in a lateral direction and a front frame outer 32 which has a roughly U-shaped cross section being relatively narrow in the lateral direction. As shown in FIG. 3, the front frame 3 (the closed cross-section C1) is formed in a rectangular shape having a longer vertical length. The front frame 3 has, at its periphery, an outer face 3A which faces the outward side (right), an inner face 3B which faces the inward side (left), an upper face 3C which is positioned upward between the outer face 3A and the inner face 3B, and a lower face 3D which is positioned downward between the outer face 3A and the inner face 3B.

The front fame inner 31 comprises a side plate 310 which extends in the vertical direction, an upper plate 311 which extends rightward from an upper end of the side plate 310, and a lower plate 312 which extends rightward from a lower end of the side plate 310. The cylindrical portion 76 of the cross member arm 75 contacts a specified position of the lower plate 312. A penetration (through) hole 312A which has a diameter roughly equal to that of a hollow hole which the cylindrical portion 76 has is formed at the specified position of the lower plate 312. An upper flange 313 is provided to extend upward from a right end of the upper plate 311. Further, a lower flange 314 is provided to extend downward from a right end of the lower plate 312.

The front frame outer 32 comprises a side plate 320 which extends in the vertical direction. Upper and lower ends of the side plate 320 bend slightly leftward. An upper flange 321 extends from an upper end of the side plate 320, and a lower flange 322 extends downward from a lower end of the side plate 320. The upper flange 321 includes a wide portion 321A which has a partially-expanded vertical width for attaching the suspension housing 5. The upper flanges 313, 321 are contacted with each other and the lower flanges 314, 322 are contacted with each other, and these flanges are respectively fixed together by spot welding or the like. The closed cross-section C1 is formed by the front frame inner and outer 31, 32 joined together as described above.

The first bulkhead 6A (reinforcing member) and the second bulkhead 6B (reinforcing member) are arranged in the closed cross-section C1 of the front frame 3 in order to increase the rigidity of the closed cross-section C1. The first bulkhead 6A and the second bulkhead 6B have joint faces for an inner face of the front frame 3. These bulkheads 6A, 6B will be described specifically later.

Further, an attachment plate 33 (attachment portion) for fixing the suspension cross member 71 is arranged in the closed cross-section C1 of the front frame 3. The attachment plate 33 is made of a bent plate and has a horizontal plate portion which contacts the lower plate 312 of the front frame inner 31. The horizontal plate portion has a through hole which corresponds to a hole position of the penetration hole 312A of the lower plate 312. The above-described fastening bolt, not illustrated, is inserted into these penetration hole 312A and through hole and the hollow hole of the cylindrical portion 76 of the cross member 75. A tip portion of the fastening bolt is screwed into a weld nut 331 which is arranged on an upper-face side of the attachment plate 33, so that the front frame 3 and the suspension cross member 71 are fixed together.

<Apron Reinforcement>

The apron reinforcement 4 is a reinforcing member which is made by bending a high-rigidity plate, such as a steel plate, in an L shape, and comprises a horizontal plate 41 and a vertical plate 42 which extends downward from a right end of the horizontal plate 4. A rear end 43 (see FIG. 11) of the apron reinforcement 4 is fixed to a front pillar, not illustrated.

<Suspension Housing>

Figure 5:
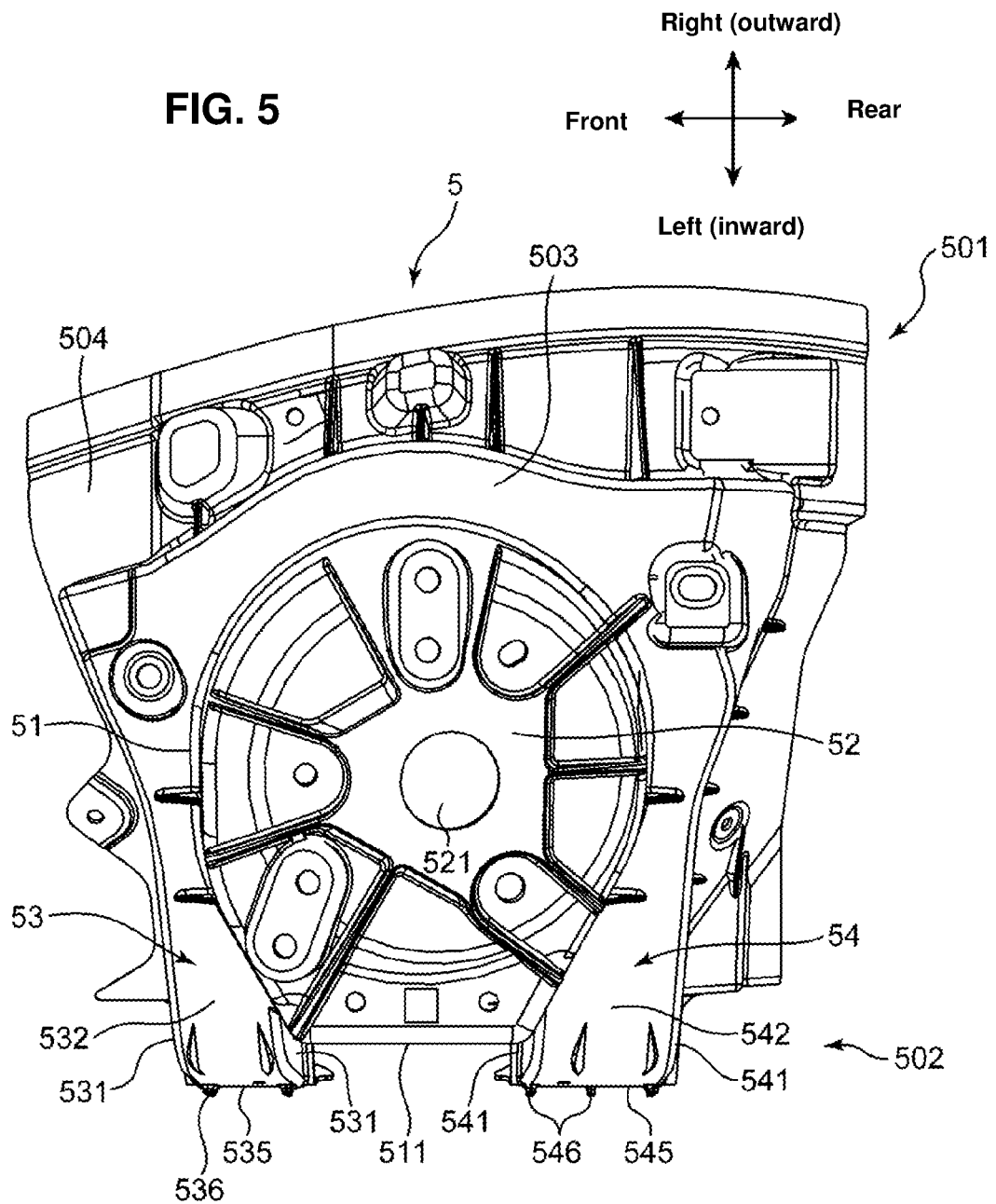
FIG. 5 is a top plan view of the suspension housing.
Figure 6:
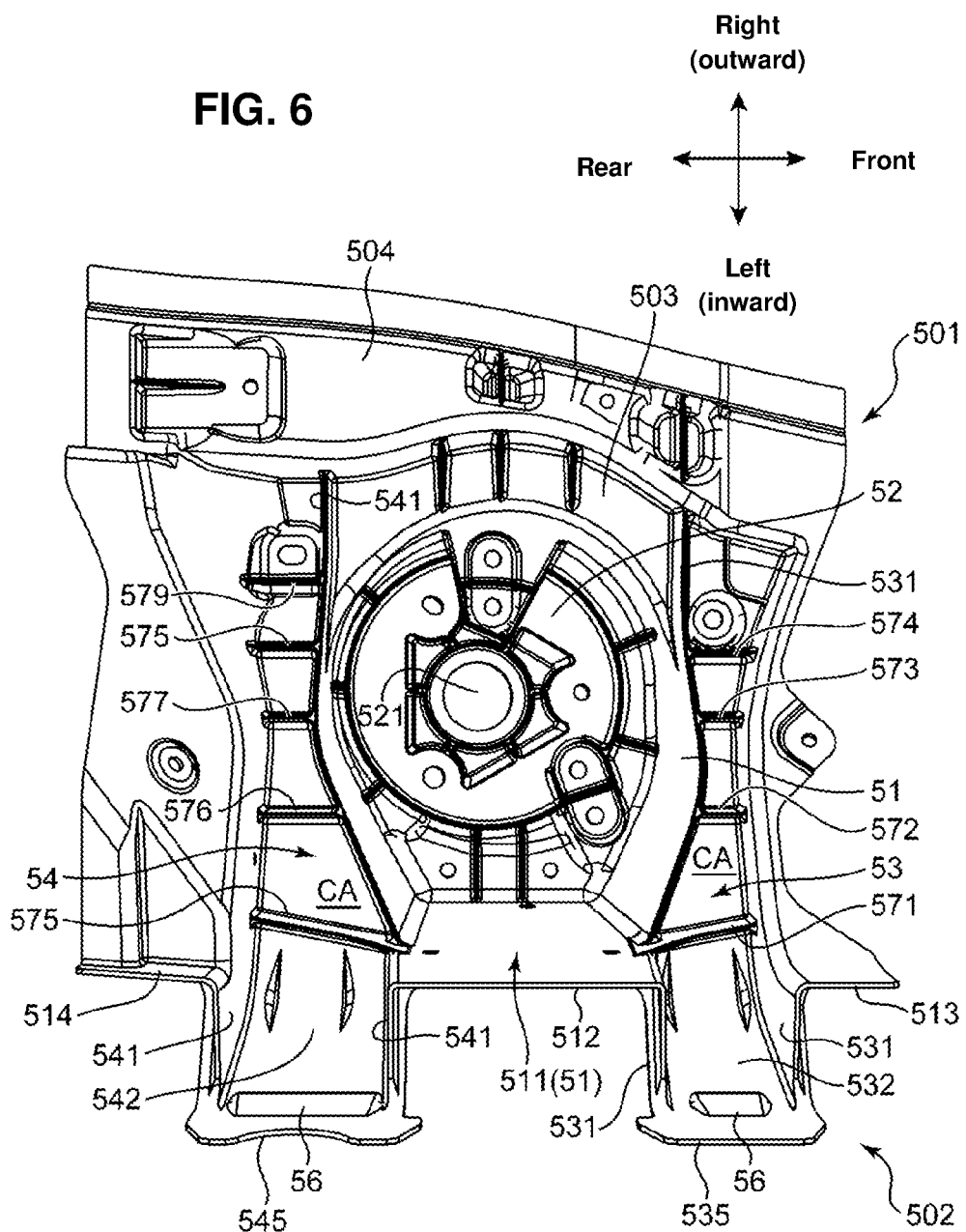
FIG. 6 is a bottom plan view of the suspension housing.
Figure 7:
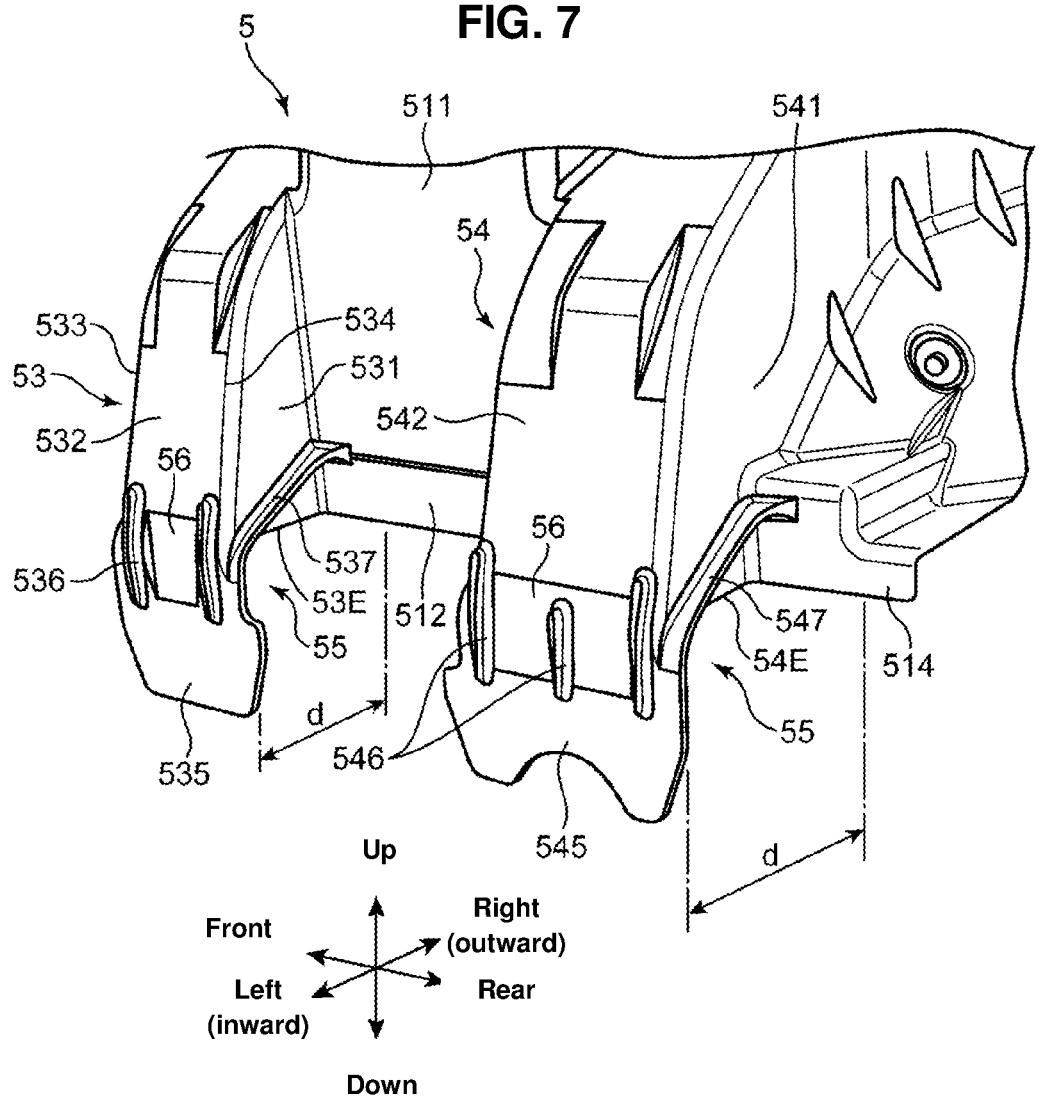
FIG. 7 is a perspective view of the vicinity of a lower end of the suspension housing.

FIGS. 5 through 7 will be referred to additionally to FIGS. 2 through 4. FIG. 5 is a top plan view of the suspension housing 5, FIG. 6 is a bottom plan view of the suspension housing 5, and FIG. 7 is a perspective view of the vicinity of a lower end of the suspension housing 5. The suspension housing 5 comprises a housing body 51, a suspension top portion 52, and first and second closed cross-sections 53, 54. A right end side of the suspension housing 5 is an upper end 501 which is fixed to the apron reinforcement 4, and a left end side of the suspension housing 5 is a lower end 502 which is fixed to the front frame 3. There exists a difference in height between a level of the upper end 501 and a level of the lower end 502, which corresponds to a difference in height between the apron reinforcement 4 and the upper face 3C of the front frame 3.

The housing body 51 is a roughly truncated-cone shaped tower which accommodates the damper of the suspension. The suspension top portion 52 is positioned at a top of the housing body 51. The suspension top portion 52 has a suspension attachment hole 521 into which the upper end of the damper is attached. The housing body 51, which has a roughly circular horizontal cross-section, includes a flat face portion 511 at its left face. The flat face portion 511 is a vertical wall which extends downward from the suspension top portion 52 to the lower end 502.

A flat upper-face portion 503 is provided on the right of the suspension top portion 52. The upper face portion 503 is positioned at a level which is lower than the suspension top portion 52 and extends longitudinally in a belt shape. An upper end flange is provided to extend on the right of the upper face portion 503. The upper face portion 503 and the upper end flange 504 are connected by a vertical plate 505.

As shown in FIG. 3, the suspension top portion 52 becomes a load input portion P1 where a vertical load is inputted from the suspension. The suspension housing 5 is fixed to the apron reinforcement 4 such that the upper end 501 is located above the level of the lower end 502. Accordingly, when the load is inputted upward to the load input portion P1 from below, the suspension housing 5 deforms easily, falling down inwardly in the vehicle width direction, as shown by an arrow F. As described previously, even if the slight inward falling-down deformation occurs, the various performances of maneuverability/stability, NVH, strength/durability, and the like are affected.

It is required, in order to resist a force of the above-described inward falling-down deformation, to improve the sectional secondary moment of the suspension housing 5 against a deformation force of the arrow F direction. The first open cross-section 53 and the second open cross-section 54 are provided at the suspension housing 5 in order to increase the above-described sectional secondary moment. The open cross-section used in the present description does not mean a cross section which is fully closed like the above-described closed cross-section C1 or a cross section which is closed by a plate except a slight opening, but means a cross section having an opening which is formed by plural bending portions so as to have a swollen part, such as a squire-pillar shaped or V shaped swollen pan. The first open cross-section 53 and the second open cross-section 54 are arranged away from each other in the vehicle longitudinal direction at the suspension housing 5, specifically arranged longitudinally such that the housing body 51 (the flat space portion 511) is positioned between the both.

The first open cross-section 53 extends in the vehicle width direction between the front frame 3 and the apron reinforcement 4 in front of the housing body 51. The first open cross-section 53 is a squire-pillar shaped (so-called hat shaped) open cross-section which is formed by a pair of front-and-rear side plates 531 and a connecting plate 532. Open cross-section spaces CA are shown in FIG. 6. The open cross-section spaces CA open toward the side of the wheel house WH. As shown in FIG. 7, the pair of side plates 531 have a width d which corresponds to a width, in the vehicle width direction, of the upper face 3C of the front frame 3 at a position near the lower end 502 which is positioned on the side of the front frame 3 (on the left side). The connecting plate 532 connects upper end edges of the pair of side plates 531 (inward end edges, in the vehicle width direction, of the pair of side plates 531 at the position near the lower end 502).

The front-side side plate 531 extends substantially from the front side frame 3 to the apron reinforcement 4. Meanwhile, a part of the rear-side side plate 531 is exposed to the outside at a position near a left end of the first open cross-section 53, that is—in an area substantially from the front frame 3 to the flat face portion 511 of the housing body 51. As shown in FIG. 6, a portion of the rear-side side plate 531 which is positioned near its right end is positioned behind the upper face portion 503, and a central portion is continuous to a right-side part of the housing body 51.

Each of the pair of side plates 531 and the connecting plate 532 (two faces of the open cross-section) cross each other roughly perpendicularly. A crossing portion of the front-side side plate 531 and the connecting plate 532 is a front ridgeline portion 533, and a crossing portion of the rear-side side plate 531 and the connecting plate 532 is a rear ridgeline portion 534. The front ridgeline portion 533 extends in the vehicle width direction substantially from the front frame 3 to the apron reinforcement 4. The rear ridgeline portion 534 extends substantially from the front frame 3 to the flat face portion 511. Herein, a right end of the rear ridgeline portion 534 connects to a ridgeline where the connecting plate 532 and a front-side vertical wall of the housing body 51 cross each other, and the rear ridgeline portion 534 which is substantially a high rigidity portion extends to a position near the apron reinforcement 4. These front-and-rear ridgeline portions 533, 534 serve as a high-rigidity portion to increase the rigidity of the first open cross-section 53, thereby contributing to an improvement of the sectional secondary moment of the suspension housing 5.

The second open cross-section 54 extends in the vehicle width direction between the front frame 3 and the apron reinforcement 4 in back of the housing body 51. The second open cross-section 54 is a hat-shaped open cross-section which is formed by a pair of front-and-rear side plates 541 and a connecting plate 542, similarly to the first open cross-section 53. The pair of side plates 541 also have a width d which corresponds to the width, in the vehicle width direction, of the upper face 3C of the front frame 3 at a position near the end portion which is positioned on the side of the front frame 3. The connecting plate 542 connects upper end edges of the pair of side plates 541 (inward end edges, in the vehicle width direction, of the pair of side plates 541).

The side plates 541 and the connecting plate 542 are similar to the side plates 531 and the connecting plate 532 of the first open cross-section 53 except the wider longitudinal with of the connecting plate 542 than that of the connecting plate 532 of the first open cross-section 53. A portion where the front-side side plates 541 and the connecting plate 542 cross each other is a front ridgeline portion 543, and a portion where the rear-side side plates 541 and the connecting plate 542 cross each other is a rear ridgeline portion 544. The rear ridgeline portion 544 is the ridgeline which corresponds to the front ridgeline portion 533 of the first open cross-section 53, and the front ridgeline portion 543 is the ridgeline which corresponds to the rear ridgeline portion 534. These front-and-rear ridgeline portions 543, 544 serve as a high-rigidity portion to increase the rigidity of the second open cross-section 54, thereby contributing to the improvement of the sectional secondary moment of the suspension housing 5.

<Description of Connectional Structure Portion of Suspension Housing>

Subsequently, a connectional structure portion positioned on the side of the upper end 501 and a connectional structure portion positioned on the side of the lower end 502 will be described. A connection portion of the upper end 501 to the apron reinforcement 4 is formed by the upper face portion 503 and the upper end flange 504. Referring to FIG. 3, the upper face portion 503 overlaps a left portion of the horizontal plate 41 of the apron reinforcement 4 in the vertical direction. A portion of the upper end flange 504 which is positioned near its right end overlaps a lower flange of the vertical plate 42. The upper end 501 and the apron reinforcement 4 are fixed at these overlapping portions.

Since the connection portion of the upper end 501 and the apron reinforcement 4 is formed, a closed cross-section C2 which extends in the longitudinal direction is formed at this connection portion. That is, a right-side portion of the horizontal plate 41 and a left-side portion of the upper end flange 504 face each other, being spaced apart from each other, and also the vertical plate 42 and the vertical plate 505 face each other, being spaced apart from each other. A space enclosed by these is the closed cross-section C2. The rigidity of a portion of the suspension housing 5 which is positioned on the side of the upper end 501 is increased by the closed cross-section C2.

Next, a connectional structure portion positioned on the side of the lower end 502 will be described. The suspension housing 5 includes separation portions 55 and first and second connection portions 535, 545 at its lower end 502 which is a connection portion to front frame 3. The separation portions 55 are provided to make the end portions of the first and second open cross-sections 53, 54 which are positioned on the lower end 502 (the end portions positioned on the side of the front frame 3) and the upper face 5C of the front frame 3 contactless. FIG. 7 shows a lower end edge 53E of the first open cross-section 53 and a lower end edge 54E of the second open cross-section 54. These lower end edges 53E, 54E face the upper face 5C having a gap of the separation portions 55. That is, the first and second open cross-sections 53, 54 are disconnected from each other at the position of the separation portions 55.

The front frame 3 is positioned adjacently to the wheel house WH. Accordingly, it is assumed that water drops are jumped up onto the upper face 5C from the side of the wheel house WH during traveling in the rain or the like. If the lower end edges 53E, 54E of the first and second open cross-sections 53, 54 extend downward to a position located close to the upper face 5C, the water drops tend to easily stay on this close portion. In the present embodiment, however, the lower end edges 53E, 54E and the upper face 5C are spaced apart from each other by providing the separation portions 55, the water drops can be properly prevented from staying on the upper face 5C.

Further, the suspension housing 5 is made of aluminum die-cast and the front frame 3 is made of the steel plate in the present embodiment. That is, while the suspension housing 5 and the front frame 3 are made of different kinds of metal, contact portions of these members can be reduced in number by providing the separation portions 55. Accordingly, problems of corrosion because of contact of different kinds of metal and the like, especially a problem of electrolytic corrosion caused by water can be suppressed.

The first and second connection portions 535, 545 are provided to connect the first and second open cross-sections 53, 54 and the inner face 3B of the front frame 3. The first connection portion 535 is a flat plate portion which is continuous downward from a lower end of the connecting plate 532 of the first open cross-section 53. Likewise, the second connection portion 545 is a flat plate portion which is continuous downward from a lower end of the connecting plate 532 of the second open cross-section 54. The first and second connection portions 535, 545 extend downward beyond the separation portions 55, overlapping an upper portion of the inner face 3B in the lateral direction. The first and second connection portions 535, 545 are fixed to the inner face 3B at their overlapping portions with the inner face 3B by spot welding or the like. FIG. 3 schematically shows this fixation portion by reference character of an inward fixation portion P2.

The suspension housing 5 has a connection portion for a flange portion 3F of the front frame 3 (on the side of the outer face 3A) which is positioned on the side of the lower end 502. The suspension housing 5 includes a first extension portion 512, a second extension portion 513, and a third extension portion 514 in order to provide the above-described connection portion. The first extension portion 512 is a flat plate portion which is provided continuous to a lower end of the flat face portion 511, and is positioned between the first open cross-section 53 and the second open cross-section 54. The second extension portion 513 is a flat plate portion which is provided adjacently in front of the first open cross-section 53. The third extension portion 514 is a flat plate portion which is provided adjacently in back of the second open cross-section 54.

As shown in FIGS. 2 and 7, the lower end edges 53E, 54E of the first and second open cross-sections 53, 54 and the lower end edges of the first, second and third extension portions 512, 513, 514 are identical. Further, as shown in FIG. 6, the first-third extension portions 512-514 are arranged substantially at the same position in the lateral direction and straightly in the longitudinal direction. The end portions of the first and second open cross-sections 53, 54 which are positioned on the side of the front frame protrude leftward from a flat face which the first-third extension portions form.

The flange portion 3F of the front frame 3 includes the wide portion 321A which has the longer vertical width than the other part as described previously. The wide portion 321A has a longitudinal width which can face all of the first-third extension portions 512-514. The first-third extension portions 512-514 overlap the wide portion 321A in the lateral direction, and these overlapping portions are fixed by spot welding or the like. FIG. 3 shows the fixation portions by reference character of an outward fixation portion P3. The second extension portion 513, the first connection portion 535, the first extension portion 512, the second connection portion 545, and the third extension portion 514 are aligned in this order from the front side when viewed in the vehicle longitudinal direction. Accordingly, the outward fixation portion P3 and the inward fixation portion P2 are aligned alternatively in the vehicle longitudinal direction.

<Reinforcing Structure of Suspension Housing>

The suspension housing 5 increases the resistance against the deformation in the vehicle width direction by providing the first and second open cross-sections 53, 54, and has a further reinforcing structure additionally to this. The suspension housing 5 is provided with first vertical ribs 536, second vertical ribs 546, first lateral ribs 537, second lateral ribs 547, thick wall portions 56, and inner ribs 571-579 (FIG. 6) as the additional reinforcing structure.

The first vertical ribs 536 are provided at the first connection portion 535 which is provided continuously to the first open cross-section 53, and the second vertical ribs 546 are provided at the second connection portion 545 which is provided continuously to the second open cross-section 54. The first and second vertical ribs 536, 546 are reinforcing portions to suppress bending deformation, in the vehicle width direction, of the first and second connection portions 535, 545, respectively. Since the lower end 502 of the suspension housing 5 and the inner face 3B of the front frame 3 are connected by the first and second connection portions 535, 545 having no open cross-section because the separation portions 55 are provided, this portion may be able to become a weak part in mechanical strength. However, by providing the first and second vertical ribs 536, 546, the rigidity of the first and second connection portions 535, 545 can be increased, so that the inward falling-down deformation of the suspension housing 5 can be restrained.

The first vertical ribs 536 are provided to protrude at a left face of the first connection portion 535, which are slender ribs extending in the vertical direction. Herein, an example in which the two first vertical ribs 536 are provided in parallel having a gap in the longitudinal direction between them is shown. Likewise the second vertical ribs 546 are provided to protrude at a left face of the second connection portion 545, which are slender ribs extending in the vertical direction. Herein, since the second connection portion 545 is relatively wide, the three second vertical ribs 546 are provided in parallel having a gap in the longitudinal direction between them.

The first lateral ribs 537 are provided to protrude at positions located near respective lower ends of the pair of side plates 531 of the first open cross-section 53, and the second lateral ribs 547 are provided to protrude at positions located near respective lower ends of the pair of side plates 541 of the second open cross-section 54. The first and second lateral ribs 537, 547 suppress bending deformation in the lateral direction of the pair of side plates 531, 541. That is, while the side plates 531, 541 become weaker at around the lower end edges 53E, 54E because of forming the separation portions 55, the rigidity of those is increased by the first and second lateral ribs 537, 547.

Each of the first lateral ribs 537 is a slender rib slanting leftward and downward, and the front-side first lateral rib 537 extends from the second extension portion 513 up to the first connection portion 535 and the rear-side first lateral rib 537 extends from the first extension portion 512 up to the first connection portion 535. Likewise, each of the second lateral ribs 547 is a slender rib slanting leftward and downward, and the front-side second lateral rib 547 extends from the first extension portion 512 up to the second connection portion 545 and the rear-side second lateral rib 547 extends from the third extension portion 514 up to the second connection portion 545. Herein, the first and second lateral ribs 537, 547 may be arranged at either one of the pair of side plates 531, 541 alternatively.

The thick wall portions 56 are provided for increasing the first and second connection portions 535, 545 having no open cross-section structure in addition to the first and second vertical ribs 536, 546. The thick wall portions 56 are formed at the positions which face the separation portions 55, and a plate thickness of each thick-wall-portion 56 forming part of the first and second connection portions 535, 545 is configured to be thicker than that of any other part of the suspension housing 5. As shown in FIG. 6, the thick wall portions 56 protrude on each back-face side of the first and second connection portions 535, 545 such that each thickness thereof becomes greater (thicker) toward an upward position. This kind of thick wall portion 56 can be easily made of aluminum die-cast. At the first connection portion 535, the thick wall portion 56 is arranged between the pair of right-and-left first vertical ribs 536. Further, at the second connection portion 545, the thick wall portion 56 is arranged between the foremost and rearmost second vertical ribs 536. The middle second vertical rib 546 among the three ribs 546 is provided to protrude on the thick wall portion 56. The rigidity of the first and second connection portions 535, 545 is increased by the above-described arrangement of the thick wall portion 56.

The inner ribs 571-579 are the ribs extending longitudinally which partition the open cross-sections CA of the first and second open cross-sections 53, 54 as shown in FIG. 6. The four inner ribs 571, 572, 573, 574 are arranged at specified intervals in the open cross-section CA of the first open cross-section 53. The inner ribs 571-574 extend over a space between the pair of side plates 531 and partition the open cross-section CA of the first open cross-section 53 into plural spaces. The five inner ribs 575, 576, 577, 578, 579 are arranged at specified intervals in the open cross-section CA of the second open cross-section 54. The inner ribs 575-579 extend over a space between the pair of side plates 541 and partition the open cross-section CA of the second open cross-section 54 into plural spaces.

<Bulkheads>

As shown in FIG. 4, the first bulkhead 6A and the second bulkhead 6B (reinforcing members) are arranged in the closed cross-section C1 of the front frame 3 in order to reinforce the cross-section. The first bulkhead 6A and the second bulkhead 6B are members which are made by applying punching or bending processing to a high-rigidity plate, such as the steel plate, and these bulkheads 6A, 6B are arranged to partition the closed cross-section C1, thereby achieving the performance of increasing the rigidity of the closed cross-section C1. The first bulkhead 6A is arranged substantially in an extension area of the first open cross-section 53 being extended downward, and the second bulkhead 6B is arranged substantially in an extension area of the first open cross-section 53 being extended downward, respectively, which will be described in detail.

Figure 8:
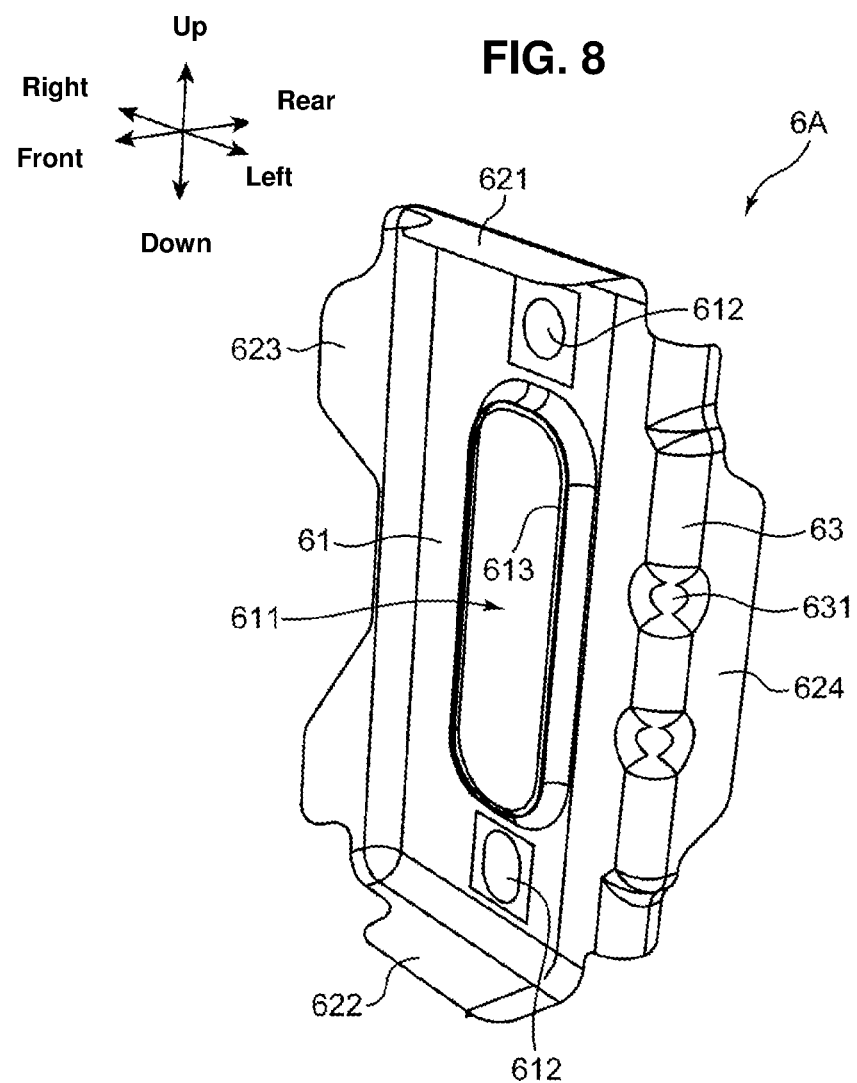
FIG. 8 is a perspective view of a first bulkhead.

FIG. 8 is a perspective view of the first bulkhead 6A. The first bulkhead 6A includes a partition face portion 61 which is made of a flat member extending perpendicularly to an extension direction (the longitudinal direction) of the closed cross-section C1. The partition face portion 61 is formed in a rectangular shape having a longer vertical side, and its size is substantially the same as a sectional size of the closed cross-section C1. The space of the closed cross-section C1 is partitioned longitudinally by this partition face portion 61.

An upper flange 621, a lower flange 622, a right flange 623, and a left flange 624 are provided to protrude from four sides of the partition face portion 61, respectively. These flanges 621, 622, 623, 624 have a tongue-piece shape, and are formed by being bent substantially at right angles to the partition face portion 61. Bending directions of three of those are a forward direction except the left flange 624 having a rearward bending direction.

The flanges 621, 622, 623, 624 are joint portions to the front frame 3. Referring to FIGS. 3 and 4, the upper flange 621 is fixed to the upper plate 311 of the front frame inner 31, the lower flange 622 is fixed to the lower plate 312, the right flange 623 is fixed to the side plate 320 of the front frame outer 32, and the left flange 624 is fixed to the side plate 310 of the front frame inner 31, respectively, by spot welding.

Two concave portions 631 are provided at a ridgeline portion 63 of a border between the partition face portion 61 and the left flange 624. The concave portion 631 is a hemisphere concave portion which is produced by draw-forming such that a part of the ridgeline portion 63 protrudes rightward and rearward. The rigidity of the bulkhead 6A can be increased by this forming of the concave portion 631, so that a reinforcing performance of the closed cross-section C1 by means of the first bulkhead 6A can be improved. While an example shown in FIG. 8 shows that the concave portions 631 are formed only at the ridgeline portion 63 of the left flange 624 having the longest vertical length, a similar concave portion may be provided at a ridgeline portion of any other flange.

A large through (penetration) hole 611 and two small through (penetration) holes 612 are provided at the partition face portion 61. The large through hole 611 is a vertically-long hole to allow a fluid to flow in the longitudinal direction properly therethrough. The partition face portion 61 covers the closed cross-section C1 of the front frame 3 extending in the longitudinal direction. There is a process of applying rust-preventive agent by electrodeposition coating, which is one of manufacturing processes of the vehicle body including the front vehicle body 1, where the vehicle body is immersed into electrodeposition liquid. Herein, if the closed cross-section C1 is covered with the partition face portion 61, there is a case in which the electrodeposition liquid may not properly reach an inner face of the front frame 3. Forming the large through hole 611 can make the electrodeposition liquid flow longitudinally through the large though hole 611, thereby performing the electrodeposition coating properly. The small through hole 612 can make the electrodeposition liquid flow therethrough, hut this hole 612 is provided mainly for the spot welding. Further, forming of the large through hole 611 and the small through hole 612 contributes to the weight reduction of the first bulkhead 6A.

A flange portion 613 which is formed by a burring process is provided at an edge portion of the large through hole 611. The flange portion 613 is formed by bending an edge portion of the large through hole 611 forward. While the large through hole 611 performs the flowing of the electrodeposition liquid, the weight reduction and the like as described above, the rigidity of the partition face portion 61 is decreased by forming of this through hole 611. Therefore, the rigidity of the partition face portion 61 is increased by forming the flange portion 613 at the edge portion of the large through hole 611. Particularly, since the flange portion 613 is formed in a vertically-long shape, the resistance of the partition face portion 61 against a load inputted, in the vertical direction, to the first bulkhead 6A can be increased. That is, the partition face portion 61 has a strong resistance against the load inputted from the suspension top portion 52 by way of the first open cross-section 53.

Figure 9:
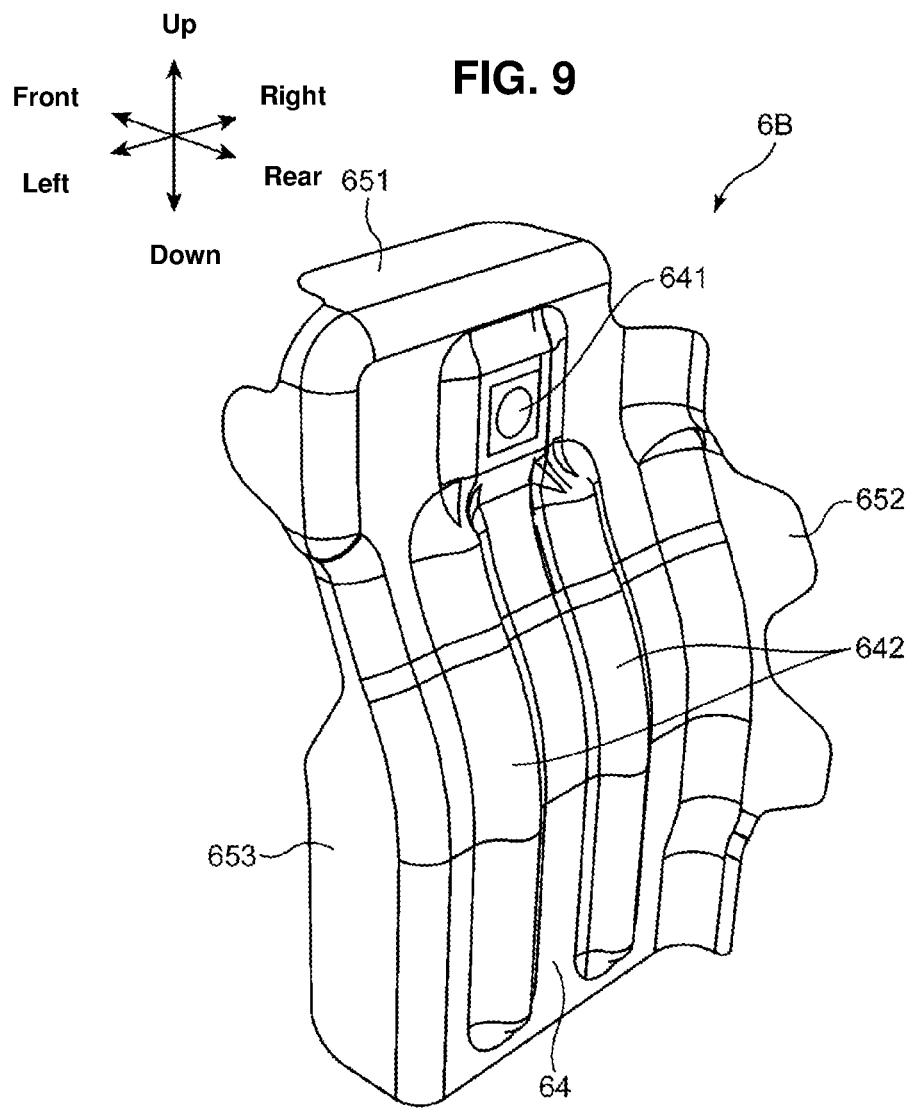
FIG. 9 is a perspective view of a second bulkhead.

FIG. 9 is a perspective view of the second bulkhead 6B. The second bulkhead 6B has a partition face portion 64 which longitudinally partitions the space of the closed cross-section C1, which is similar to the above-described partition face portion 61. The partition face portion 64 is a flat plate which is gently curved in the longitudinal direction, and has a rectangular shape having a longer vertical length. Its size is substantially the same as the sectional size of the closed cross-section C1. An upper flange 651, a lower flange (not illustrated in FIG. 9), a right flange 652, and a left flange 653 are provided to protrude from four sides of the partition face portion 64, respectively. These flanges 651, 652, 653 have a tongue-piece shape, respectively, and are formed by being bent substantially at right angles to the partition face portion 64. Bending directions of three of those are a forward direction except the right flange 652 having a rearward bending direction.

The flanges 651, 652, 653 are joint portions to the front frame 3. Referring to FIGS. 3 and 4, the upper flange 651 is fixed to the upper plate 311 of the front frame inner 31, the lower flange, not illustrated, is fixed to the lower plate 312, the right flange 652 is fixed to the side plate 320 of the front frame outer 32, and the left flange 653 is fixed to the side plate 310 of the front frame inner 31, respectively, by spot welding.

A large through (penetration) hole 641 and two rigidity reinforcement portions 642 extending in the vertical direction are provided at the partition face portion 64. The small through hole 641 is provided mainly for the flowing of the electrodeposition liquid, the spot welding. The rigidity reinforcement portion 642 is produced by a burring process such that part of the partition face portion 64 is protruded rearward having a cross section formed in a semicircular shape. The rigidity of the partition face portion 64 is increased by forming of the rigidity reinforcement portion 642. Since the rigidity reinforcement portion 642 is formed in the vertically-long shape, the resistance of the partition face portion 64 against a load inputted, in the vertical direction, to the second bulkhead 6B can be increased. That is, the partition face portion 64 has a strong resistance against the load inputted from the suspension top portion 52 by way of the second open cross-section 54.

<Other Structure Portions of Front Vehicle Body>

Further, a mudguard 8 and a wheel apron are provided at the front vehicle body 1 (see FIG. 4). The mudguard 8 is a member which covers over the wheel house WH to prevent dirty mud, pebbles, water drops, or the like which are jumped up by a tire from hitting against the vehicle body or coming in. The mudguard 8 is arranged below the suspension housing 5, and has an attachment portion for the suspension housing 5. Further, the mudguard 8 includes an extension portion (not illustrated) which covers opening portions of back faces of the first open cross-section 53 and the second open cross-section 54 at a position located near a lower end thereof. The wheel apron 9 is arranged in back of and below the suspension housing 5 so as to shut off a traveling noise of the tire.

[Arrangement Relationships Between Open Cross-Sections and Bulkheads]

Figure 10:
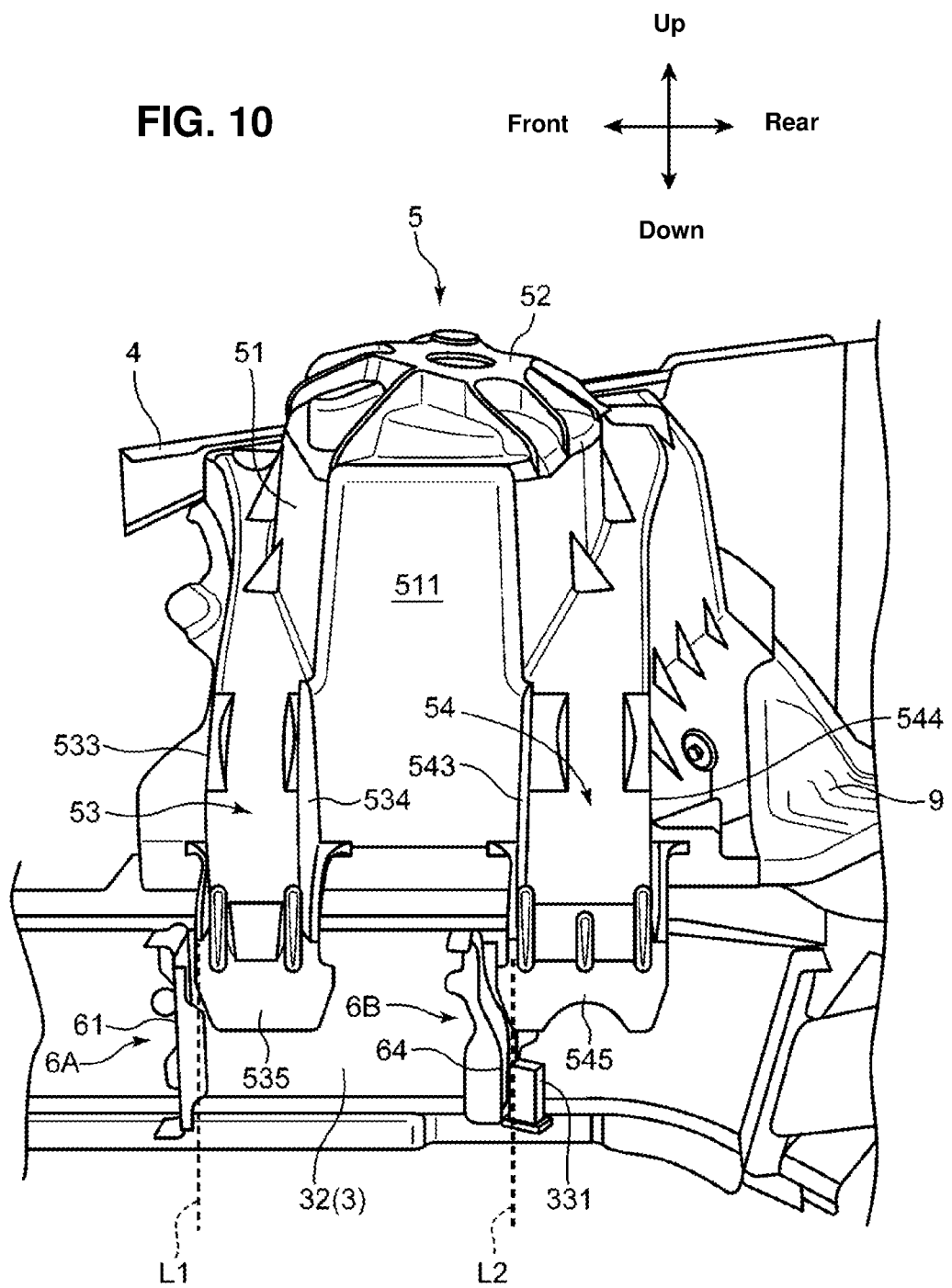
FIG. 10 is a perspective view which shows arrangement relationships between an open cross-section of the suspension housing and the bulkheads.

In the present embodiment, the resistance against the load inputted from the suspension top portion 52 is increased by devising arrangement (positional) relationships between the first and second open cross-sections 53, 54 of the suspension housing 5 and the first and second bulkheads 6A, 6B arranged in the closed cross-section C1 of the front frame 3. This point will be described referring to FIG. 10. FIG. 10 is a perspective view for explaining the arrangement relationships between the first and second open cross-sections 53, 54 and the first and second bulkheads 6A, 6B. FIG. 10 shows a state in which the front frame 3 is removed from the front frame inner 31.

The first bulkhead 6A is arranged in the closed cross-section C1 and located near a position which is continuous to a lower-end side of the front ridgeline portion 533 which is one of the high-rigidity portions extending in the vehicle width direction which the first open cross-section 53 includes. A virtual line L1 which is continuous to the lower-end side of the front ridgeline portion 533 is illustrated in FIG. 10. The first bulkhead 6A (the partition face portion 61) is located at a position which is slightly offset forward from the virtual line L1. This arrangement (location) of the first bulkhead 6A increases the rigidity of the portion of the front frame 3 where the load from the first open cross-section 53 is inputted.

Likewise, the second bulkhead 6B is arranged in the closed cross-section C1 and located near a position which is continuous to a lower-end side of the front ridgeline portion 543 which is one of the high-rigidity portions extending in the vehicle width direction which the second open cross-section 54 includes. A virtual line L2 which is continuous to the lower-end side of the front ridgeline portion 543 is illustrated in FIG. 10, in addition to the above-described virtual line L1. The second bulkhead 6B (the partition face portion 64) is located at a position which is slightly offset forward from the virtual line L2. This arrangement (location) of the second bulkhead 6B increases the rigidity of the portion of the front frame 3 where the load from the second open cross-section 54 is inputted. Further, an attaching plate 33 (a weld nut 331 is illustrated only in FIG. 10) for fixing the suspension cross member 71 is arranged near an arrangement position of the second bulkhead 6B.

FIG. 10 illustrates an example of the arrangement embodiment of the first and second bulkheads 6A, 6B according to the present invention. Preferably, the first bulkhead 6A is arranged in the closed cross-section C1 so as to be continuous to the front ridgeline 533 of the first open cross-section 53 (along the virtual line L1) or to be continuous to the rear ridgeline portion 534. Also, it is preferable that the second bulkhead 6A be arranged in the closed cross-section C1 so as to be continuous to the front ridgeline 543 of the second open cross-section 54 (along the virtual line L2) or to be continuous to the rear ridgeline portion 544.

Figure 11:
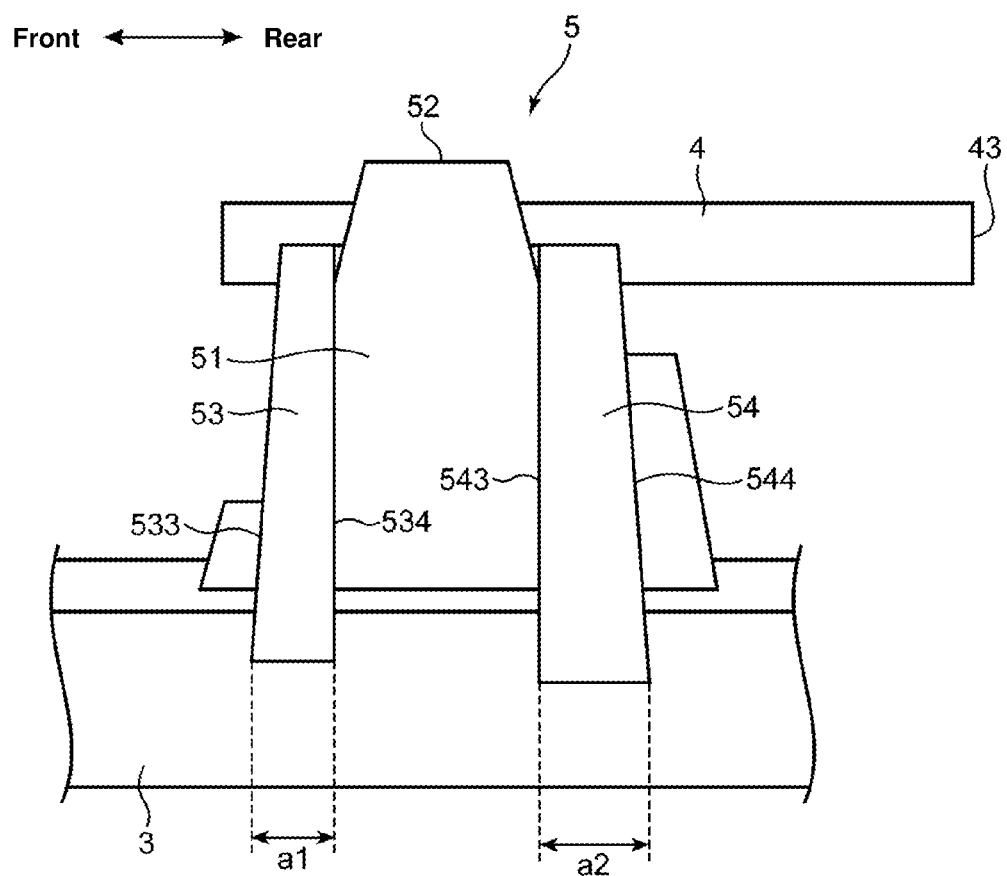
FIG. 11 is a schematic diagram which shows a function and a modification of the suspension housing.

Moreover, the first and second bulkheads 6A, 6B may be arranged at any position of the width, in the longitudinal direction, of the first and second open cross-sections 53, 54. FIG. 11 is a diagram which schematically shows the front frame 3 and the suspension housing 5. In FIG. 11, a longitudinal width of the first open cross-section 53 is denoted by reference character a1, and a longitudinal width of the second open cross-section 54 is denoted by reference character a2. The first bulkhead 6A is arranged in the closed cross-section C1 of the front frame 3 within a range of the longitudinal width a1. Further, the second bulkhead 6B is arranged in the closed cross-section C1 within a range of the longitudinal width a2. The range of the longitudinal width a1 is an area which is interposed between the two high-rigidity portions of the front ridgeline portion 533 and the rear ridgeline portion 534, where the load from the first open cross-section 53 is inputted. Accordingly, the above-described load can be received by arranging the first bulkhead 6A in the range of the longitudinal width a1. The relationship between the longitudinal width a2 and the second bulkhead 6B is the same.

The case in which the first and second bulkheads 6A, 6B are arranged slightly in front of the range of the longitudinal widths a1, a2 is one embodiment of the present invention, which has been described referring to FIG. 10. To the contrary, the first and second bulkheads 6A, 6B may be arranged slightly in back of the range of the longitudinal widths a1, a2. An area longitudinally near the range of the longitudinal widths a1, a2 is also the one where the load from the first and second open cross-sections 53, 54 is inputted. Accordingly, even in a case in which the first and second bulkheads 6A, 6B are arranged at a position which is slightly offset from the range of the longitudinal widths a1, a2, the load can be received properly.

[Operations/Effects]

The front vehicle-body structure of the vehicle according to the present embodiment described above provides the following operations/effects. The suspension housing 5 comprises the first open cross-section 53 and the second open cross-section 54 which extend in the vehicle width direction so as to interconnect the front frame 3 and the apron reinforcement 4. The first open cross-section 53 has the high-rigidity portions of the front ridgeline portion 533 and the rear ridgeline portion 534 which extend in the vehicle width direction. Further, the second open cross-section 54 has the high-rigidity portions of the front ridgeline portion 543 and the rear ridgeline portion 544 which extend in the vehicle width direction. Accordingly, the resistance against the deformation, in the vehicle width direction, of the suspension housing 5 is increased.

The first bulkhead 6A which reinforces the rigidity of the closed cross-section C1 of the front frame 3 is arranged in the closed cross-section C1 and located near the position which is continuous to the front ridgeline portion 533 of the first open cross-section 53, and the second bulkhead 6B is arranged in the closed cross-section C1 and located near the position which is continuous to the front ridgeline portion 543 of the second open cross-section 54. Thereby, the face rigidity of the portion of the front frame 3 where the load is transmitted from the suspension housing 5 is increased by the first and second bulkheads 6A, 6B, so that the load can be dispersed to other members by way of the front frame 3. Accordingly, the deformation, in the vehicle width direction, of the suspension housing 5 can be restrained.

Referring to FIG. 3, the load is inputted upward to the suspension top portion 52 as the load input portion P1 from below. Thereby, the force denoted by the arrow F (an inward falling-down deforming force) acts on the suspension housing 5. The deforming force of the arrow F is transmitted to around the upper face 3C of the front frame 3 from the first and second open cross-sections 53, 54 mainly. Especially, this force is easily transmitted to areas on or near the extension lines of the front ridgeline portions 533, 543 and the rear ridgeline portions 534, 544 which are the high-rigidity portions of the first and second open cross-sections 53, 54. In the present embodiment, the first and second bulkheads 6A, 6B are arranged in these areas, respectively. Thereby, the rigidity of the closed cross-section C1 is increased in these areas, thereby preventing the front frame 3 from being crushed by the above-described deforming force, so that this deforming force can be received by a whole part of the structural body which exists below the suspension housing 5. Accordingly, the inward falling-down deformation of the suspension housing 5 can be restrained.

More specifically, the attaching plate 33 (the weld nut 331) for fixing the suspension cross member 71 is provided near the arrangement position of the second bulkhead 6B. Accordingly, when the deforming force based on the load to the suspension top portion 52 is inputted to the second bulkhead 6B from the suspension housing 5, this force can be dispersed to the front frame 3 and the suspension cross member 71.

The first bulkhead 6A has the flange portion 613 at the edge portion of the large through hole 611 which is formed in the vertically-long hole, so that the rigidity of the partition face portion 61 against the load inputted in the vertical direction is increased. The second bulkhead 6B also has the rigidity reinforcement portions 642 extending in the vertical direction, thereby increasing the rigidity of the partition face portion 64 against the load inputted in the vertical direction is increased. The flange portion 613 and the rigidity reinforcement portion 642 are positioned substantially on the extension lines extending downward from the end portions of the front ridgeline portions 533, 543 which are the high rigidity portions of the first and second open cross-sections 53, 54. Accordingly, the first and second bulkheads 6A, 6B having the high rigidity in the input direction of the load from suspension housing 5 are assembled into the closed cross-section C2 of the front frame 3. Thereby, the strength of the closed cross-section C2 is further increased, so that the resistance against the inward falling-down deformation of the suspension housing 5 can be more improved.

As schematically shown in FIG. 11, the longitudinal width a2 of the second open cross-section 54 is wider than the longitudinal width a1 of the first open cross-section 53. The rear end 43 of the apron reinforcement 4 is fixed to the front pillar, not illustrated, and the front side of the apron reinforcement 4 is capable of swinging inward in the vehicle width direction having a swing supporting-point at this rear end 43. A swing force can be a factor for causing the inward falling-down deformation of the suspension housing 5. In this regard, the longitudinal width a2 of the second open cross-section 54 which is positioned close to the rear end 43 (swing supporting-point) is configured to be relatively wider, which is an advantageous structure for reducing a bending moment having the rear end 43 as a point of origin. This structural feature restrains the inward falling-down deformation of the suspension housing 5 as well.

[Description of Modifications]

The present invention should not be limited to the above-described embodiment, and any other modifications or improvements may be applied within the scope of a spirit of the present invention. For example, while the above-described embodiment explains the case in which the high-rigidity portions of the first and second open cross-sections 53, 54 are the front ridgeline portions 533, 543 and the rear ridgeline portions 534, 544, beads, ribs or any other members which extend in the vehicle width direction may be used as the high-rigidity portion. However, the above-described embodiment using the ridgeline portion is superior in easily forming the high-rigidity portion, compared with the case of additionally forming beads or the ribs at the first and second open cross-sections 53, 54.

What is claimed is:

1. A front vehicle-body structure of a vehicle, comprising:
a front frame extending in a vehicle longitudinal direction and having a rectangular closed cross-section, the front frame comprising a first plate and a second plate which are spaced apart, in a vehicle width direction, from each other and respectively extend in a vertical direction;
an apron reinforcement extending in a vehicle longitudinal direction and arranged above and on an outward side, in the vehicle width direction, of the front frame;
a suspension housing connecting the front frame and the apron reinforcement, to which a suspension component is attached; and
a reinforcing member arranged in the rectangular closed cross-section of the front frame and joined to the front frame,
wherein said suspension housing comprises an open cross-section extending in the vehicle width direction and interconnecting said front frame and said apron reinforcement,
said open cross-section of the suspension housing includes a high-rigidity portion extending in the vehicle width direction,
a lower end portion of said high-rigidity portion is directly connected to one of said first and second plates of the front frame on an outside of the rectangular closed cross-section of the front frame,
said suspension housing further comprises a lower-end connection portion which is directly connected to the other of said first and second plates of the front frame on the outside of the rectangular closed cross-section of the front frame, the lower-end connection portion being provided to be spaced apart, in the vehicle width direction, from said lower end portion of the high-rigidity portion,
an end portion, on the side of said front frame, of said open cross-section faces an upper face of said front frame having a gap, and
said reinforcing member is joined to each inner face of said rectangular closed cross-section of the front frame at or near a position which is continuous to an end portion, on the side of said front frame, of said high-rigidity portion.

2. The front vehicle-body structure of the vehicle of claim 1, wherein said high-rigidity portion is a ridge-line portion where two faces of said open cross-section cross each other.

3. The front vehicle-body structure of the vehicle of claim 1, wherein said front frame is composed of a pair of right-and-left front frames, a suspension cross member is provided between said pair of right-and-left front frames, and each of the pair of right-and-left front frames includes an attachment portion for fixing said suspension cross member near an arrangement position of said reinforcing member.

4. The front vehicle-body structure of the vehicle of claim 2, wherein said front frame is composed of a pair of right-and-left front frames, a suspension cross member is provided between said pair of right-and-left front frames, and each of the pair of right-and-left front frames includes an attachment portion for fixing said suspension cross member near an arrangement position of said reinforcing member.

5. The front vehicle-body structure of the vehicle of claim 1, wherein said reinforcing member is a bulkhead including a partition-face portion which partitions said rectangular closed cross-section, and said partition-face portion includes a rigidity-reinforcement portion extending in a direction of an extension line of the end portion of said high-rigidity portion.

6. The front vehicle-body structure of the vehicle of claim 2, wherein said reinforcing member is a bulkhead including a partition-face portion which partitions said rectangular closed cross-section, and said partition-face portion includes a rigidity-reinforcement portion extending in a direction of an extension line of the end portion of said high-rigidity portion.

7. The front vehicle-body structure of the vehicle of claim 3, wherein said reinforcing member is a bulkhead including a partition-face portion which partitions said rectangular closed cross-section, and said partition-face portion includes a rigidity-reinforcement portion extending in a direction of an extension line of the end portion of said high-rigidity portion.

8. The front vehicle-body structure of the vehicle of claim 4, wherein said reinforcing member is a bulkhead including a partition-face portion which partitions said rectangular closed cross-section, and said partition-face portion includes a rigidity-reinforcement portion extending in a direction of an extension line of the end portion of said high-rigidity portion.

9. The front vehicle-body structure of the vehicle of claim 1, wherein said reinforcing member is a bulkhead including a partition-face portion which partitions said rectangular closed cross-section, and said partition-face portion includes a penetration hole which is provided with a flange portion at an edge portion thereof.

10. The front vehicle-body structure of the vehicle of claim 2, wherein said reinforcing member is a bulkhead including a partition-face portion which partitions said rectangular closed cross-section, and said partition-face portion includes a penetration hole which is provided with a flange portion at an edge portion thereof.

11. The front vehicle-body structure of the vehicle of claim 3, wherein said reinforcing member is a bulkhead including a partition-face portion which partitions said rectangular closed cross-section, and said partition-face portion includes a penetration hole which is provided with a flange portion at an edge portion thereof.

12. The front vehicle-body structure of the vehicle of claim 4, wherein said reinforcing member is a bulkhead including a partition-face portion which partitions said rectangular closed cross-section, and said partition-face portion includes a penetration hole which is provided with a flange portion at an edge portion thereof.

* * * * *